United States Patent
Yacko et al.

(10) Patent No.: US 6,290,100 B1
(45) Date of Patent: Sep. 18, 2001

(54) CONCENTRATE CARTRIDGE FOR A DILUTING AND DISPENSING CONTAINER

(75) Inventors: R. Bruce Yacko; Edward L. Mueller, both of Toledo, OH (US)

(73) Assignee: Canberra Corporation, Toledo, OH (US)

( * ) Notice: Subject to any disclaimer, the term of this patent is extended or adjusted under 35 U.S.C. 154(b) by 0 days.

(21) Appl. No.: 09/608,193

(22) Filed: Jun. 30, 2000

(51) Int. Cl.[7] .............. B67D 5/56; B67D 5/40; B67D 3/00; B67D 5/06
(52) U.S. Cl. .............. 222/129; 222/383.1; 222/510
(58) Field of Search .................. 222/129, 383.1, 222/510; 215/DIG. 8; 206/219, 222

(56) References Cited

U.S. PATENT DOCUMENTS

| | | |
|---|---|---|
| 2,642,065 | 6/1953 | Negri . |
| 3,024,947 | 3/1962 | Jeynes, Jr. . |
| 3,080,094 | 3/1963 | Modderno . |
| 3,134,505 | 5/1964 | Modderno . |
| 3,172,568 | 3/1965 | Modderno . |
| 3,221,946 | 12/1965 | Riley . |
| 3,240,391 | 3/1966 | Garton . |
| 3,240,403 | 3/1966 | Modderno . |
| 3,255,924 | 6/1966 | Modderno . |
| 3,255,926 | 6/1966 | Modderno . |
| 3,314,563 | 4/1967 | Mounier . |
| 3,318,484 | 5/1967 | Modderno . |
| 3,458,076 | 7/1969 | Babcock . |
| 3,548,562 | 12/1970 | Schwattzman . |
| 3,613,955 | 10/1971 | Wethrell, Jr. . |
| 3,648,899 | 3/1972 | Lukesch et al. . |
| 3,655,096 | 4/1972 | Easter . |
| 3,891,125 | 6/1975 | Morane et al. . |
| 4,221,291 | 9/1980 | Hunt . |
| 4,613,061 | 9/1986 | Meuresch et al. . |
| 4,705,191 | 11/1987 | Itzel et al. . |
| 4,757,916 | 7/1988 | Goncalves . |
| 4,950,237 | 8/1990 | Henault et al. . |
| 5,246,142 | 9/1993 | DiPalma et al. . |
| 5,273,189 | 12/1993 | Jouillat et al. . |
| 5,348,060 | 9/1994 | Futagawa et al. . |
| 5,421,483 | 6/1995 | Parise . |
| 5,875,888 | 3/1999 | Klima et al. . |
| 5,927,549 | 7/1999 | Wood . |
| 5,944,223 | 8/1999 | Klima et al. . |
| 5,957,335 | 9/1999 | Otto ........................... 22/129 |
| 5,992,693 | 11/1999 | Albisetti . |
| 6,041,969 | 3/2000 | Parise . |
| 6,053,371 | * 4/2000 | Durliat et al. ................ 222/321.9 |
| 6,152,326 | * 11/2000 | Klima, Jr. et al. ............ 222/82 |
| 6,182,865 | * 2/2001 | Bunschoten et al. .......... 222/136 |

FOREIGN PATENT DOCUMENTS

| | | |
|---|---|---|
| 8101400 | 5/1981 | (DE) . |
| 35359866 | 4/1987 | (DE) . |
| 101594 | 2/1984 | (EP) . |
| 173547 | 3/1986 | (EP) . |
| 333541 | 9/1989 | (EP) . |
| 341115 | 11/1989 | (EP) . |
| 2239390 | 2/1975 | (FR) . |
| 2220930 | 1/1990 | (GB) . |
| 1188018 | 12/1987 | (IT) . |

\* cited by examiner

Primary Examiner—Kevin Shaver
Assistant Examiner—Stephanie L Willatt
(74) Attorney, Agent, or Firm—Donald R. Fraser

(57) ABSTRACT

A reusable concentrate cartridge adapted to be supported by a diluting and dispensing container for combining at least two separate components of a multi-component system, the concentrate cartridge having a hollow cylindrical body and a hollow tube with a closure portion. The concentrate cartridge is caused to open by the rotating engagement of a closure cap on the diluting and dispensing container to which causes the closure portion of the hollow tube to disengage to release the concentrate material.

14 Claims, 4 Drawing Sheets

CONCENTRATE CARTRIDGE FOR A DILUTING AND DISPENSING CONTAINER

FIELD OF THE INVENTION

The invention relates to a concentrate cartridge for a diluting and dispensing container for combining at least two separate components of a multi-component system that are combined before use and subsequently dispensed together as a solution. More particularly, the invention includes a reusable concentrate cartridge for use in a diluting and dispensing container for combining a concentrated material, typically a liquid, with a liquid diluent, such as water. The concentrated material is supplied in a separately packaged cartridge that is easily inserted into and removed from the reusable diluting and dispensing container. After the combined solution of concentrated material and diluent is used, the spent cartridge is removed and replaced by a fresh cartridge. Diluent is resupplied to the diluting and dispensing container and the two components are combined to form a fresh supply of the solution.

BACKGROUND OF THE INVENTION

In many instances it is desirable to retain the components of a multi-component system separate and to combine them shortly before use. This is true of systems wherein the components are incompatible either with each other as well as when it is desired to supply the consumer with a concentrated substance which can be diluted, typically with water, to form a solution.

The present invention provides a dispenser and cartridge of a concentrated substance for use in conjunction with the dispenser to combine the concentrated substance with a diluent material to form a solution having particular performance characteristics. Typical of the concentrated substances useable according to the invention are detergents that can be subsequently diluted with water to form a detergent solution of the proper concentration for use as a window cleaner, spot remover, disinfectant cleanser for hard surfaces, tub and tile cleaners, wall cleaners, etc.

Dispensers for combining the components of a multi-component system shortly before use can be classified into three distinct groups. The first group are those employing reusable containers that can be recharged with a fresh cartridge of concentrate when the solution is expended; a second group wherein the container and cartridge of concentrate are designed for a single use and subsequent disposal; and a third group wherein the cartridge for the concentrate may be refilled with concentrate after being used to produce a diluted operative solution. In the second group, the cartridge of concentrate is typically permanently contained within the container and/or dispenser.

Representative of the first class of container-dispensers is the device disclosed in the U.S. Pat. No. 3,655,096 to Easter. The patent describes a dispensing system employing a replaceable cartridge containing a concentrated liquid material in combination with a bottle and a dispensing pump device. The cartridge has frangible upper and lower surfaces and an annular flange extending from the upper surface. The cartridge is placed in the neck of the bottle and supported by the annular flange resting on the rim of the container neck. The dip tube passes through the cartridge by puncturing both its top and bottom surfaces. The concentrate will drain into and mix with a diluent, such as water. The resulting solution is dispensed by activating the pump mechanism to upwardly draw the solution through the dip tube and to expel it from a dispensing orifice in the pump head.

The second class of multi-component container dispensers includes the devices disclosed in the U.S. Pat. No. 3,024,947 to Jeynes Jr., U.S. Pat. No. 2,653,611 to Smith and U.S. Pat. No. 3,347,410 to Schwartzman. The Jeynes Jr. patent discloses a squirt bottle of the foregoing type wherein the concentrated material is present in a ring shaped aluminum foil cartridge. The concentrate cartridge is placed on a supporting flange located within the neck of the bottle. A closure cap having a dispensing orifice, a dip tube and an annular row of teeth extending downwardly is provided in the Jeynes Jr. system. The upper surface of the concentrate cartridge is punctured by the annular row of teeth when the closure cap is pressed downwardly thereby releasing the concentrate into the diluent contained in the body of the bottle. The resulting solution is expelled through the dip tube and the dispensing orifice by squeezing pressure applied to the bottle, which has flexible plastic walls.

The Schwartzman and Smith patents both provide compartments disposed in the bottle neck for holding a powdered component separate from a liquid diluent in the body of the bottle. A plunger means is provided in the closure cap for combining the powdered component and the diluent in response to downward pressure on the plunger. In Schwartzman the plunger operates through a bellows and displaces the bottom wall of the powder compartment while in Smith the plunger forces the entire compartment into the body of the bottle.

The third class employing a reusable container for the diluting fluid and a reusable cartridge for the concentrate is typically disclosed in U.S. Pat. Nos. 5,957,335 to Otto and 6,041,969 to Parise. The Otto patent discloses a concentrate cartridge comprised of a circular cylinder having one end open and the opposite end closed by a bellows-like wall. The open end is selectively opened and closed by an annular-shaped wall connected to the bellows-like wall by a hollow actuator tube.

The Parise patent discloses a container for a concentrate including a first hollow cylindrical element having an axial hole in its lower part. A second cylindrically symmetrical element is disposed inside the first element and is comprised of a collar in the shape of an inverted cup which is adapted to slide inside the first element in fluid-tight relationship. A third element in the shape of a ring which threads onto the end of the second element and when tightened forms a single piece with the second element. The external diameter of the ring allows it to slide within the hole in the bottom of the first element with engagement in such a way as to obtain a water-tight fit. The aforementioned collar and the ring effectively close the two opposing ends of the first hollow cylindrical element and defines a chamber for the concentrate. Axially movement of the collar of the second element and the associated ring opens the axial hole in the first element allowing the concentrate to exit the first element into an associated bottle containing a diluting fluid.

It is an object of the present invention is to produce a concentrate cartridge for a diluting and dispensing container which may be economically manufactured.

Still another object of the present invention is to produce a concentrate cartridge for a diluting and dispensing container for packaging concentrate to greatly reduce the costs in formulating a desired dilute solution.

Another object of the present invention is to produce a concentrate cartridge for a diluting and dispensing container which may be refilled and reused.

Another object of the present invention is to produce a concentrate cartridge for a diluting and dispensing container which may be easily and economically refilled.

Still a further object of the present invention is to produce a concentrate cartridge for a diluting and dispensing container embodying structural features to capture concentrate overflow from the cartridge.

SUMMARY OF THE INVENTION

The above, as well as other objects and advantages of the invention may typically be achieved by a dispensing container comprising: a bottle, container, or other hollow vessel having a body for containing a liquid diluent and a reduced diameter neck portion having supported therein a cartridge for containing the concentrate substance. The concentrate cartridge comprises a hollow cylindrical element having a first open end forming a closure seat and a second end including a flange extending outwardly of the cylindrical element, an annular collar, and an annular web having a generally U-shaped cross-section interconnecting the collar and the flange of the first cylindrical element; and a hollow tube having a first end portion in fluid-tight sliding relation with the annular collar of the hollow cylindrical element, and a second end terminating into a radially outwardly extending closure adapted to selectively seat with the closure seat of the hollow cylindrical element to form a fluid-tight closure therebetween.

The radially outwardly extending closure is opened in response to a downward force applied to the first end portion of the hollow tube while the hollow cylindrical element of the cartridge is held in place in the dispensing container.

A closure cap including a dispensing means, typically a pump, is provided. The closure cap includes means to mate with the neck portion of the bottle to provide a tight seal between the two members. A dip tube communicating with the dispensing pump is associated with the body portion of the bottle.

The closure cap is joined to the neck portion of the bottle usually by screwing it onto the neck and; the dip tube passes through the central passageway of the cartridge and into the body of the bottle. Before the closure cap is fully seated on the neck of the container, an inner surface of the top of the cap contacts the upper surface of the hollow tube. The additional application of downward axial force to seat the closure cap forces the hollow tube downward until the closure is opened and the concentrate flows into the diluent contained in the body of the bottle to form the desired solution. The solution is dispensed from the bottle through the dip tube and the dispensing orifice as a spray or a steam of liquid in response to activation of a hand pump associated with the closure cap.

BRIEF DESCRIPTION OF THE DRAWINGS

The above objects and advantages of the invention will become readily apparent to those skilled in the art from reading the following detailed description of the invention when considered in the light of the accompanying drawings, in which.

DESCRIPTION OF THE PREFERRED EMBODIMENT

Figure 1:
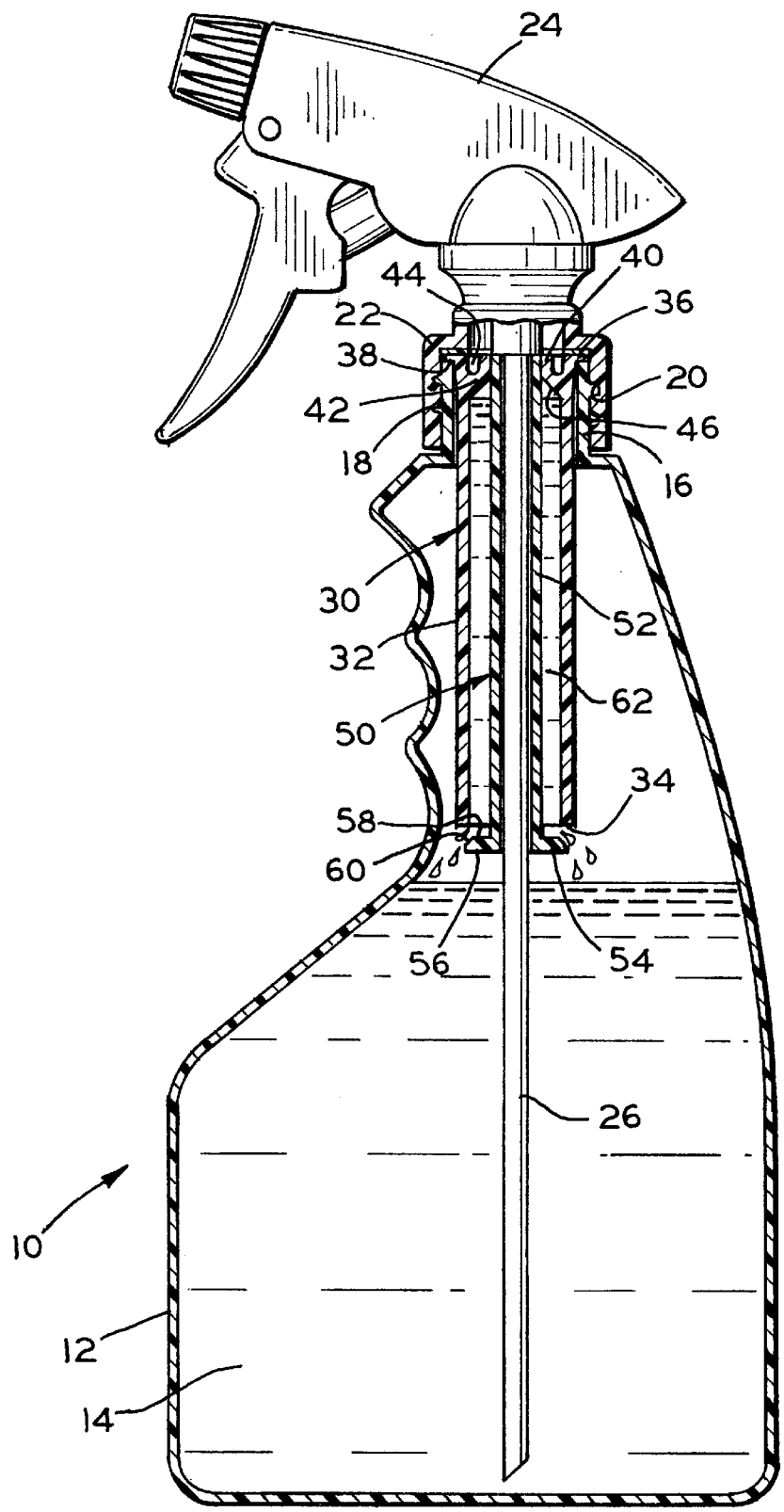
FIG. 1 is an elevational view partially in section of a concentrate cartridge embodying the features of the invention in combination with a diluting and dispensing container, and an associated pump.

Referring to the drawings, there is illustrated a diluting and dispensing container 10 having a body portion 12 for containing a diluent fluid 14 such as water, for example. The diluting and dispensing container 10 includes a hollow neck portion 16 having external threads 18 formed on the outside surface thereof for engaging the cooperating internal threads 20 formed on the inner surface of an associated closure cap 22. Other mating means may be used such as, for example, a press fit. The closure cap 22 is adapted to form a seal at the open end of the neck portion 16 of the diluting and dispensing container 10.

The closure cap 22 is rotatingly coupled to dispensing means provided with a depending dip tube 26. In the embodiment shown, the dispensing means is a hand pump 24.

Figure 3:
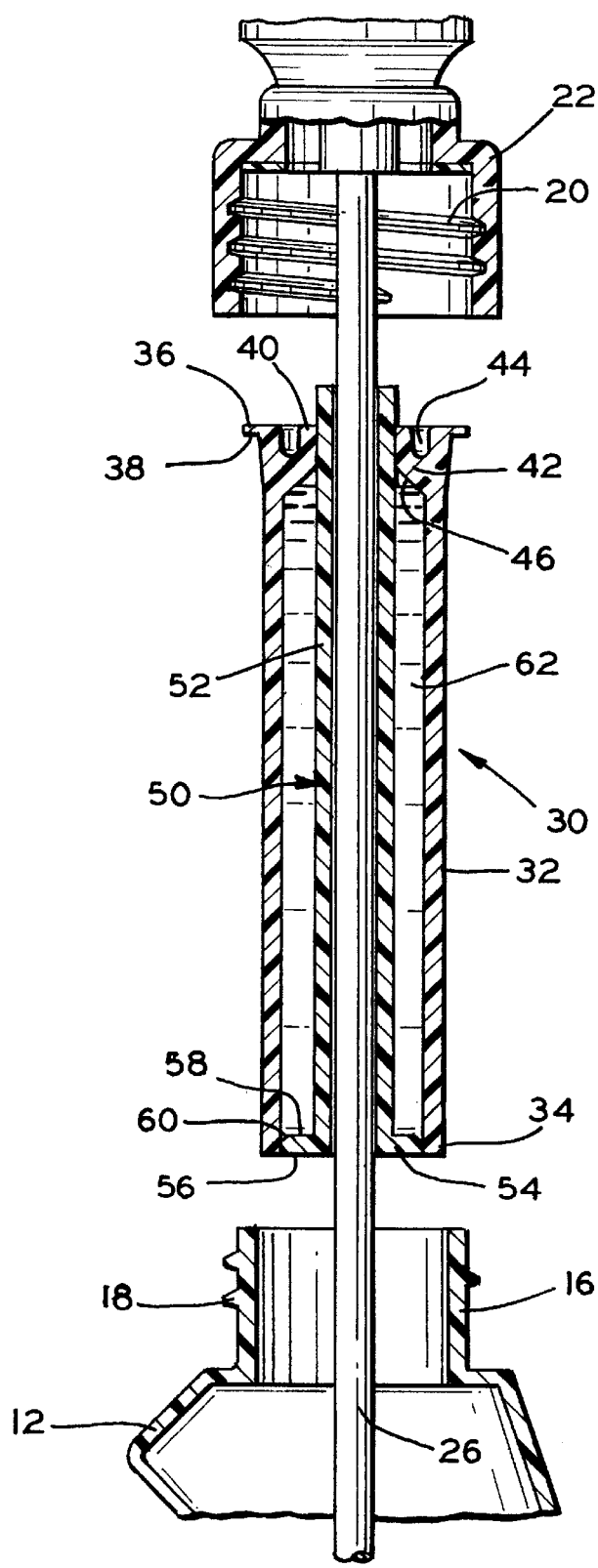
FIG. 3 is an exploded view of the container cap, the concentrate cartridge, the upper portion of the diluting and dispensing container including the threaded neck portion, and downwardly depending dip tube of the dispensing pump prior to assembly.
Figure 4:
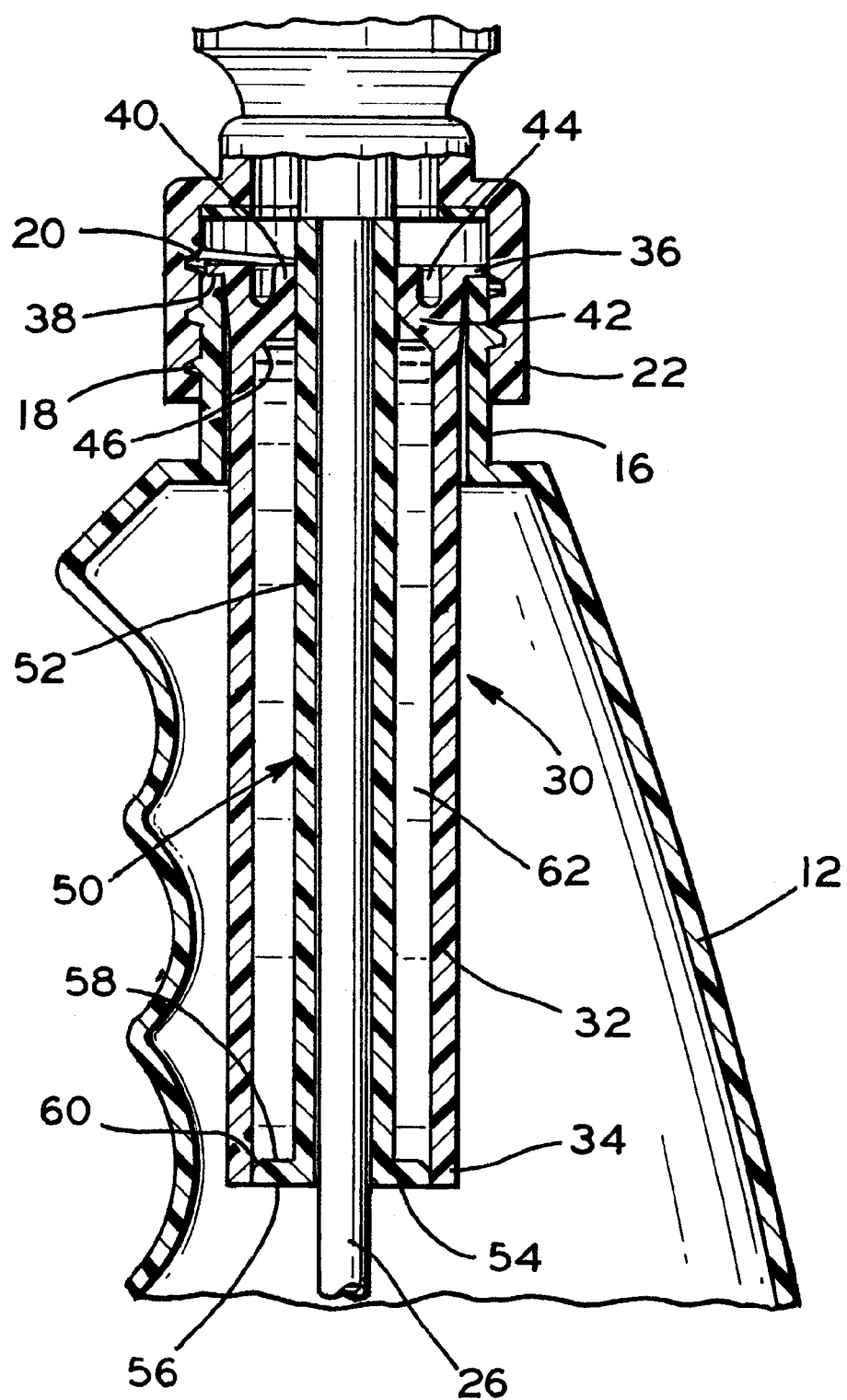
FIG. 4 is an enlarged cross-sectional view of the upper portion of the diluting and dispensing container illustrated in FIG. 1 with the container cap partially applied prior to the opening of the concentrate container as illustrated in FIG. 1.

A concentrate cartridge 30 having an outer diameter slightly smaller than the inside diameter of the neck portion 16, is provided with a main hollow cylindrical body 32 having an outer diameter slightly smaller than the inside diameter of the neck portion 16. A lower end 34 of the body 32 is open. The opposite end is provided with an outwardly extending annular flange 36 which extends completely around the outer peripheral surface of the body 32. The juncture of the under surface of the flange 36 and the outer surface of the body 32 may be formed on a radius. The radius terminates in a ledge 38 adapted to rest on the upper open end of the neck portion 16 of the diluting and dispensing container 10. The adjacent outer surface of the body 32 is flared outwardly slightly as illustrated in FIG. 3 at 38. The under surface of the flange 36 is generally flat and serves to support the concentrate cartridge 30 within the neck portion 16 of the diluting and dispensing container 10.

The upper end of the concentrate cartridge 30 includes an annular collar 40. The annular collar 40 is interconnected to the inner portion of the body 32 and in the region of the flange 36 by an annular web 42. It will be observed that the inner surface of the upper portion of the body 32, the annular web 42, and the outer surface of the annular collar 40 form a trough 44 which is generally U-shaped in cross-section.

The inner surface 46 formed by the juncture of the annular collar 40 and the annular web 42 is inclined inwardly and upwardly from the inner surface of the body 32 to the inner surface of the annular collar 40.

The concentrate cartridge 30 includes an associated closure member 50. The closure member 50 is comprised of a hollow tube portion 52 having a radially outwardly extending closure 54 at one end thereof. The closure 54 is formed with a generally flat outer surface 56 and an opposing inner surface 58. The outer peripheral surface of the inner surface 58 is provided with an inclined camming surface or bevel 60.

Figure 2:
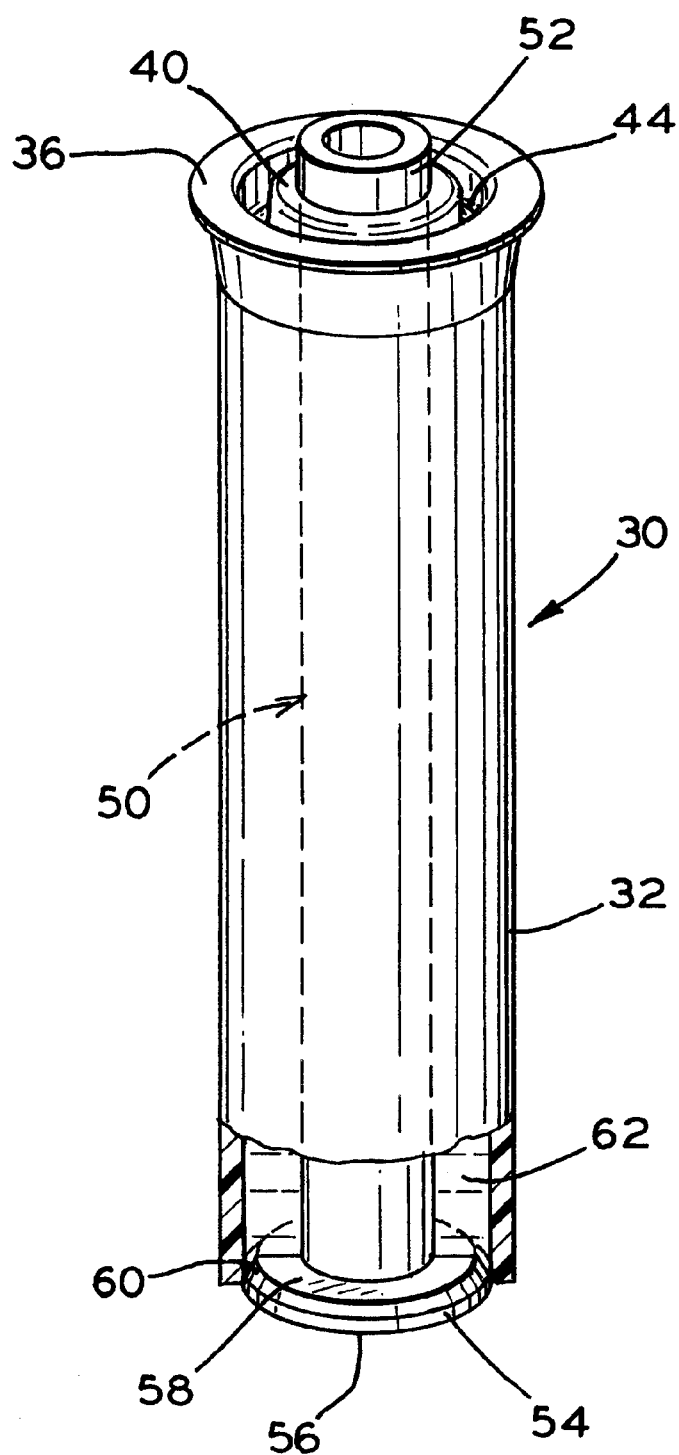
FIG. 2 is an enlarged perspective view of the concentrate cartridge illustrated in FIG. 1 partially in section.

The assembly of the body 32 and the closure member 50 is typically achieved by inserting the free end of the tube portion 52 into the interior of the body 32 toward the open interior of the annular collar 40. This procedure is simplified by the existence of the inclined inner surface 46 which functions to readily guide the end of the tube portion 52 into the annular collar 40. To effect a complete closure, the closure member 50 is caused to move axially within the body 32 until the camming surface 60 of the closure 54 cooperates with the lower end 34 of the body 32 to seal in a fluid-tight connection. The free end of the tube portion 52 extends through the annular collar 40 to protrude slightly, as clearly illustrated in FIG. 2. As a general rule, a concentrate 62 is inserted, manually or automatically, to the interior of the concentrate cartridge 30 before the closure member 50 is closed to seal the concentrate 62 within the concentrate cartridge 30.

Once filled with the concentrate 62, the lower end 34 of the concentrate cartridge 30 is inserted into the neck portion 16 of the diluting and dispensing container 10. The concentrate cartridge 30 is guided to seat properly within the neck portion 16 by the flared portion of the adjacent outer surface of the body 32. Ideally, the outer surface of the body 32 of the concentrate cartridge 30 is substantially smooth which facilitates sliding and positioning of the concentrate cartridge 30 within the neck portion 16. A material of construction such as high-density polyethylene, for example, provides such qualities.

When the concentrate cartridge 30 is fully inserted into the neck portion 16, the ledge 38 abuts the upper edge of the neck portion 16 to suspend the concentrate cartridge 30 within the diluting and dispensing container 10. The neck portion 16 of the diluting and dispensing container 10 is inserted into the closure cap 22 of the hand pump 24. The closure cap 22 is then caused to rotate to engage the internal threads 20 and the external threads 18 to effect closure of the diluting and dispensing container 10. As the closure cap 22 is caused to close on the diluting and dispensing container 10, the top of the tube portion 52 is contacted by the closure cap 22 and caused to be slid downwardly within the body 32 of the concentrate cartridge 30. The closure 54 is thereby caused to disengage from the lower end 34 of the body 32 of the concentrate cartridge 30 releasing the concentrate 62 into the diluting and dispensing container 10.

Undesirable leakage from the concentrate cartridge 30 is minimized due to the tight fit between the annular collar 40 and the tube portion 52 and between the closure 54 and the lower end 34. Should leakage occur from between the annular collar 40 and the tube portion 52, during shipment or storage for example, the leaked concentrate 62 is contained within the trough 44 and permitted to dry. The trapping of the leaked concentrate 62 militates against damage to shipping and storage containers, for example.

From the foregoing description, one ordinarily skilled in the art can easily ascertain the essential characteristics of this invention and, without departing from the spirit and scope thereof, can make various changes and modifications to the invention to adapt it to various usages and conditions in accordance with the scope of the appended claims.

What is claimed is:

1. A concentrate cartridge comprising:
   a hollow cylindrical element having a first open end forming a closure seat and a second end including a flange extending outwardly of said hollow cylindrical element, an annular collar, and an annular web having a generally U-shaped cross-section interconnecting the collar and the flange of said first cylindrical element; and
   a hollow tube having a first end portion in fluid-tight sliding relation with the annular collar of said hollow cylindrical element, and a second end terminating into a radially outwardly extending closure adapted to selectively seat with the closure seat of said hollow cylindrical element to form a fluid-tight closure therebetween.

2. The concentrate cartridge according to claim 1, wherein said hollow cylindrical element includes an outer surface, the outer surface having a flared portion adjacent the second end of said hollow cylindrical element.

3. The concentrate cartridge according to claim 1, wherein said hollow cylindrical element includes an inner surface and the annular collar includes an inner surface, the inner surface of said hollow cylindrical element adjacent the second end of said hollow cylindrical element is inclined inwardly and upwardly to terminate at the inner surface of the annular collar.

4. The concentrate cartridge according to claim 1, wherein said hollow cylindrical element is formed of high-density polyethylene.

5. The concentrate cartridge according to claim 1, wherein said hollow tube is formed of high-density polyethylene.

6. The concentrate cartridge according to claim 1, wherein the closure of said hollow tube includes a beveled annular surface to facilitate seating with the closure seat of said hollow cylindrical element.

7. A dispensing container comprising:
   a hollow vessel having a body for containing a liquid diluent and a neck portion having supported therein a concentrate cartridge for containing a concentrate substance, the concentrate cartridge comprising:
      a hollow cylindrical element having a first open end forming a closure seat and a second end including a flange extending outwardly of said hollow cylindrical element, an annular collar, and an annular web having a generally U-shaped cross-section interconnecting the collar and the flange of the first cylindrical element; and
      a hollow tube having a first end portion in fluid-tight sliding relation with the annular collar of said hollow cylindrical element, and a second end terminating into a radially outwardly extending closure adapted to selectively seat with the closure seat of said hollow cylindrical element to form a fluid-tight closure therebetween;
   a closure cap including a dispensing means, said closure cap including means to mate with the neck portion of said hollow vessel to provide a tight seal; and
   a dip tube communicating with the dispensing means inserted through said hollow tube of the concentrate cartridge and into the body of said hollow vessel.

8. The dispensing container according to claim 7, wherein said hollow cylindrical element includes an outer surface, the outer surface having a flared portion adjacent the second end of said hollow cylindrical element.

9. The dispensing container according to claim 7, wherein said hollow cylindrical element includes an inner surface and the annular collar includes an inner surface, the inner surface of said hollow cylindrical element adjacent the second end of said hollow cylindrical element is inclined inwardly and upwardly to terminate at the inner surface of the annular collar.

10. The dispensing container according to claim 7, wherein said hollow cylindrical element is formed of high-density polyethylene.

11. The dispensing container according to claim 7, wherein said hollow tube is formed of high-density polyethylene.

12. The dispensing container according to claim 7, wherein the closure of said hollow tube includes a beveled annular surface to facilitate seating with the closure seat of said hollow cylindrical element.

13. The dispensing container according to claim 7, wherein the mating means between said closure cap and the neck portion of said hollow vessel is cooperating threads.

14. The dispensing container according to claim 7, wherein said hollow vessel is formed of high-density polyethylene.

* * * * *

UNITED STATES PATENT AND TRADEMARK OFFICE
CERTIFICATE OF CORRECTION

PATENT NO. : 6,290,100 B1 Page 1 of 2
APPLICATION NO. : 09/608193
DATED : September 18, 2001
INVENTOR(S) : R. Bruce Yacko and Edward L. Mueller It is certified that error appears in the above-identified patent and that said Letters Patent is hereby corrected as shown below:

Column 5, line 48, cancel the text beginning with "1. A concentrate cartridge" to and ending "a fluid tight closure therebetween." in column 5, line 62, and insert the following claim:

1. A concentrate cartridge comprising:
a hollow cylindrical element having a first open end forming a closure seat and a second end including a flange extending outwardly of said hollow cylindrical element, an annular collar having a hollow inner uninterrupted surface, and an annular rigid web having a generally U-shaped cross-section forming an integral connection between the collar and the flange of said first cylindrical element; and a hollow tube having a first end portion in fluid-tight sliding relation through the hollow inner surface of the annular collar of said hollow cylindrical element, and a second end terminating in a radially outwardly extending closure adapted to selectively seat with the closure seat of said hollow cylindrical element to form a fluid-tight closure therebetween.

Column 5, line 67, cancel the text beginning with "3. The concentrate cartridge" to and ending "the annular collar." in column 6, line 5, and insert the following claim:

3. The concentrate cartridge according to claim 1, wherein said hollow cylindrical element includes an inner surface adjacent the second end of said hollow cylindrical element, the inner surface of said hollow cylindrical element is inclined inwardly and upwardly to terminate at the inner surface of the annular collar to facilitate sliding reception of the first end portion of said hollow tube.

Column 6, line 15, cancel the text beginning with "7. A dispensing container" to and ending "of said hollow vessel." in column 6, line 40, and insert the following claim:

7. A dispensing container comprising:
a hollow vessel having a body for containing a liquid diluent and a neck portion having supported therein a concentrate cartridge for containing a concentrate substance, the concentrate cartridge comprising:
a hollow cylindrical element having a first open end forming a closure seat and a second end including a flange extending outwardly of said hollow cylindrical element, an annular collar having a hollow inner surface, and an annular rigid web having a generally U-shaped cross-section forming an integral connection between the collar and the flange of the first cylindrical element;

Signed and Sealed this

Sixth Day of July, 2010

David J. Kappos
*Director of the United States Patent and Trademark Office* a hollow tube having a first end portion in fluid-tight sliding relation with the hollow inner surface of the annular collar of said hollow cylindrical element, and a second end terminating into a radially outwardly extending closure adapted to selectively seat with the closure seat of said hollow cylindrical element to form a fluid-tight closure therebetween;
a closure cap including a dispensing means, said closure cap including means to mate with the neck portion of said hollow vessel to provide a tight seal; and
a dip tube communicating with the dispensing means inserted through said hollow tube of the concentrate cartridge and into the body of said hollow vessel.

Column 6, line 45, cancel the text beginning with "9. The dispensing container" to and ending "of said hollow tube." in column 6, line 51, and insert the following claim:

9. The dispensing container according to claim 7, wherein said hollow cylindrical element includes an inner surface adjacent the second end of said hollow cylindrical element, the inner surface of said hollow cylindrical element is inclined inwardly and upwardly to terminate at the inner surface of the annular collar to facilitate sliding reception of the first end portion of said hollow tube.